US010453424B2

United States Patent
Ellis et al.

(10) Patent No.: US 10,453,424 B2
(45) Date of Patent: Oct. 22, 2019

(54) METHOD AND APPARATUS FOR CONTROLLING A DISPLAY COMPRISING TWO OR MORE PANELS

(71) Applicant: DISPLAYLINK (UK) LIMITED, Cambridge (GB)

(72) Inventors: Daniel Ellis, Cambridge (GB); Douglas Morse, Houghton (GB); Richard Jonathan Petrie, Guildford (GB)

(73) Assignee: DISPLAYLINK (UK) LIMITED, Cambridge (GB)

( * ) Notice: Subject to any disclaimer, the term of this patent is extended or adjusted under 35 U.S.C. 154(b) by 0 days.

(21) Appl. No.: 15/561,516

(22) PCT Filed: Mar. 17, 2016

(86) PCT No.: PCT/GB2016/050745
§ 371 (c)(1),
(2) Date: Sep. 25, 2017

(87) PCT Pub. No.: WO2016/151291
PCT Pub. Date: Sep. 29, 2016

(65) Prior Publication Data
US 2018/0068638 A1    Mar. 8, 2018

(30) Foreign Application Priority Data

Mar. 26, 2015    (GB) .................................. 1505182.4

(51) Int. Cl.
*G09G 5/12* (2006.01)
*G06F 3/14* (2006.01)
*G06T 3/40* (2006.01)

(52) U.S. Cl.
CPC ............. *G09G 5/12* (2013.01); *G06F 3/1438* (2013.01); *G06F 3/1446* (2013.01);
(Continued)

(58) Field of Classification Search
CPC .... G06F 3/1423; G06F 3/1431; G06F 3/1438; G06F 3/147; G06F 3/1446; G06F 1/1647;
(Continued)

(56) References Cited

U.S. PATENT DOCUMENTS 7,995,003 B1    8/2011  Diard et al.
2003/0234749 A1*  12/2003  Marks ................... G06F 3/1454
                                                            345/2.1
(Continued)

FOREIGN PATENT DOCUMENTS

EP            1 785 981        5/2007

OTHER PUBLICATIONS

PCT Search Report, PCT Application No. PCT/GB2016/050745, dated Jun. 13, 2016, 3 pages.
(Continued)

*Primary Examiner* — Md Saiful A Siddiqui
(74) *Attorney, Agent, or Firm* — Haynes and Boone LLP

(57) ABSTRACT

An apparatus for co-ordinating display data sent to a display device includes two or more panels or sub-displays together forming a single display screen for displaying at least one complete image. Each display panel has a display input for receiving display data of part of the complete image from a corresponding display output of a display control device. The display control device receives, from a host device, packets of display data destined for one of the display panels. The display control device directs the packets to one or more processors in the display control device for processing and storing the display data in a respective buffer according to which respective display panel the display data is destined for. The processed display data is output from the buffers at a synchronized time to the display output corresponding to the respective display panel for which the display data is destined.

20 Claims, 5 Drawing Sheets

(52) U.S. Cl.
CPC ..... *G06T 3/4038* (2013.01); *G09G 2300/026* (2013.01); *G09G 2352/00* (2013.01)

(58) Field of Classification Search
CPC .. G06F 3/14; G09G 2300/026; G09G 3/3225; G09G 3/36; G09G 3/3648; G09G 2300/04; G09G 2300/043; G09G 2352/00
See application file for complete search history.

(56) References Cited

U.S. PATENT DOCUMENTS

| | | | |
|---|---|---|---|
| 2008/0055189 A1* | 3/2008 | Wilk | G06F 3/1431 345/1.3 |
| 2008/0211825 A1* | 9/2008 | Sunakawa | G06F 3/1446 345/581 |
| 2010/0156757 A1* | 6/2010 | Naito | G06F 3/1446 345/1.1 |
| 2011/0216082 A1 | 9/2011 | Caskey et al. | |
| 2014/0307168 A1 | 10/2014 | Law et al. | |
| 2016/0104455 A1* | 4/2016 | Chiu | G09G 5/12 345/1.3 |

OTHER PUBLICATIONS

Application No. GB1505182.4, Search Report, dated Sep. 21, 2015, 4 pages.

\* cited by examiner

METHOD AND APPARATUS FOR CONTROLLING A DISPLAY COMPRISING TWO OR MORE PANELS

RELATED APPLICATIONS

This application is a U.S. National Stage patent application of International Patent Application No. PCT/GB2016/050745 (filed on Mar. 17, 2016), the benefit of which is claimed, and claims priority to Great Britain Patent Application No. 1505182.4 entitled "Method and Apparatus for Controlling a Display Comprising Two or More Panels," which was filed Mar. 26, 2015, each of which are hereby incorporated by reference in their entirety.

TECHNICAL FIELD

This disclosure is directed to methods and apparatus for co-ordinating display data sent to a display device that comprises two or more panels, or sub-displays.

BACKGROUND

In desktop computing, it is now common to use more than one display device such as an external monitor, projector, or multiple monitors placed in a matrix to form a video wall. Traditionally, a user would have a computer with a single display attached, but now it is possible to have more than one display attached to the computer, which increases the usable area for the worker. For example, International Patent Application Publication WO 20071020408 discloses a display system comprising a plurality of displays, each displaying respectively an image; a data processing device connected to each display and controlling the image shown by each display; and a user interface device connected to the data processing device. Connecting multiple displays to a computer is a proven method for improving productivity.

The connection of an additional display to a computer or other device that produces display data, commonly known as a host, presents a number of problems. In general, a computer will be provided with only one video output such as a VGA-out connection. One method by which a display can be added to a computer is by adding an additional graphics card to the internal components of the computer. The additional graphics card will provide an additional video output which will allow the display to be connected to the computer and driven by that computer. However, this solution is relatively expensive and is not suitable for many non-technical users of computers.

An alternative method of connecting a display is to connect the display to a USB socket on the computer, as all modern computers are provided with multiple USB sockets. This provides a simple connection topology, but requires additional hardware and software to be present, as in general, managing the USB bandwidth between the various peripherals using the USB makes the provision of a good quality video output a non-trivial task.

As displays grow in size and resolution, even more display data must be sent down the connection to each display. One way to limit the amount of data that must pass down a single connection is to form a single display by placing two smaller display panels next to each other and sending half the display data to be shown on the entire display to each panel. The two panels appear to the user to be part of a continuous display. The technology is similar to a video wall, but these comprise many distinct displays which are not presently synchronised. The lack of synchronisation between panels often results in a visible artefact known as tearing and may also result in other display artefacts and errors such as interference and flickering. Under the current art, synchronisation requires a long delay between the preparation of display data and its display to allow for the display data to arrive at both panels simultaneously, due to the fact that commands are sent serially rather than in parallel.

The present invention aims to solve at least some of the above-mentioned problems.

SUMMARY

According to a first aspect of the invention, there is provided a method of controlling a display device, the display device having at least two display panels, the display panels together forming a single display screen for displaying at least one complete image, each display panel having a display input for receiving display data of part of the complete image from a corresponding display output of a display control device, the method comprising:

receiving, at the display control device, a plurality of packets of display data from a host device, wherein the display data in each packet is destined for one of the display panels;

directing the packets to one or more processors of a processing module in the display control device for processing the display data;

processing the display data and storing the processed display data in a respective buffer according to which respective display panel the display data is destined for; and controlling the processing module so that the processed display data is output from the buffers at a synchronized time to the display output corresponding to the respective display panel for which the display data is destined.

The display panels may be of any size, comprising any proportion of the display screen as a whole. There may be any number of display panels greater than one and the size of a display panel and number of display panels may be provided by software or hardware. Furthermore, the display panels may be of different sizes and need not be rectangular in shape.

The use of multiple display panels to form a single display screen is beneficial because it means that each display panel can have its own connection and can be smaller than the overall display screen, thus minimising the problems caused by limited bandwidth. A large display screen can be therefore be supplied with data using multiple low-bandwidth connections. This is also a benefit of having multiple inputs to the display device: each connection has its own bandwidth allocation.

Because the operating system of the host device treats the display panels as separate displays, the display data is transmitted from the host in streams such that there is one stream per input and therefore per display panel. These streams may be interleaved through a single cable or wireless signal and subsequently split in order to be directed to the associated inputs and display panels, or they may be sent simultaneously through different connections, one associated with each input and display panel.

The use of synchronisation between the display panel inputs is beneficial because it means that it is possible to ensure that the entire display screen will be updated in time and at the same frequency. This will reduce problems at the point where display panels meet, where lack of synchronisation between the display panels can result in the visual artefact known as tearing. If the inputs to the two or more display panels are synchronised, this will not occur and the user need not be aware of the presence of multiple display panels, thus improving user experience.

In a preferred embodiment, the processing module comprises a plurality of processors, each having an associated respective buffer, with a respective processor processing display data destined for a respective display panel, and each packet being directed to a respective processor according to which respective display panel the display data contained in that packet is destined for.

Preferably, controlling the processing module so that the processed display data is output at a synchronized time to the display output corresponding to the respective display panel for which the display data is destined comprises:
  receiving, at each of the plurality of processors, a common timing signal comprising periodic timing markers; and
  instructing the respective processors to control the respective buffers to output the respective processed data from a respective buffer when a particular timing marker is received.

Instructing the processors to control the respective buffers to output the respective processed data from a respective buffer when a particular timing marker is received may comprise:
  sending a first command to a first processor of the plurality of processors to ignore one or more first timing markers after receiving the command and to control a first respective buffer to start to output the respective processed data when a particular subsequent timing marker is received; and
  sending a second command to a second processor of the plurality of processors to control a second respective buffer to start to output the respective processed data when the particular subsequent timing marker is received.

The method may further comprise receiving, from the first processor of the plurality of processors, an acknowledgement of receipt of the first command before sending the second command to the second processor.

In an embodiment, instructing the processors to control the respective buffers to output the respective processed data from a respective buffer when a particular timing marker is received preferably comprises:
  sending a command to each of the processors in sequence instructing the respective processor to ignore at least as many timing markers after receiving the command as there are processors following the respective processor in the sequence of processors and to control a respective buffer to start to output the respective processed data when a next timing marker after the ignored timing markers is received. The method may further comprise receiving, from each processor of the plurality of processors, an acknowledgement of receipt of the command before sending a command to the next processor in the sequence.

Preferably, controlling the processing module so that the processed display data is output at a synchronized time to the display output corresponding to the respective display panel for which the display data is destined comprises:
  receiving, at each of the buffers, a common timing signal comprising periodic timing markers; and
  controlling each of the buffers to start to output the respective processed data to the respective display output when a particular timing marker is received.

Controlling each of the buffers to start to output the respective processed data to the respective display output when a particular timing marker is received may comprise:
  sending a first command to a first buffer of the plurality of buffers to ignore one or more first timing markers after receiving the command and to start to output the respective processed data when a particular subsequent timing marker is received; and
  sending a second command to a second buffer of the plurality of buffers to start to output the respective processed data when the particular subsequent timing marker is received.

The method may further comprise receiving, from the first buffer of the plurality of buffers, an acknowledgement of receipt of the first command before sending the second command to the second buffer.

Preferably, controlling each of the buffers to start to output the respective processed data to the respective display output when a particular timing marker is received comprises:
  sending a command to each of the buffers in sequence instructing the respective buffer to ignore at least as many timing markers after receiving the command as there are buffers following the respective buffer in the sequence of buffers to start to output the respective processed data when a next timing marker after the ignored timing markers is received.

The common timing signal is preferably received from a local clock in the display control device or is received at the display control device from the host device. The common timing signal preferably comprises regular timestamp packets transmitted on a Universal Serial Bus, USB, connection between the display control device and the host device.

This embodiment is beneficial because it makes use of USB, which is provided on most devices and is a well-known connection method that is straightforward for a user. The USB signal further contains regular timestamp packets broadcast at predictable intervals. These can be used to derive synchronisation signals and it is beneficial to use them for this purpose in order to take best advantage of existing technology.

Alternatively, in another embodiment the common timing signal comprises broadcast synchronisation packets transmitted on an Ethernet connection between the display control device and the host device. Such signals could be used in the same way as hereinbefore described.

In one embodiment, the plurality of packets of display data is received from the host device over a general purpose data connection. The general purpose data connection may comprises a Universal Serial Bus, USB, connection or an Ethernet connection. Processing each packet of display data in the processing module for outputting to the display output corresponding to the respective display panel for which the display data contained in the packet is destined preferably comprises converting the display data into a display-specific format, which may be VGA, DVI, HDMI or DisplayPort format.

The plurality of packets of display data may be received in a common stream of display data from the host device, and the method may further comprise determining, for each packet of display data in the common stream, which display panel the display data contained in the packet is destined for and directing the packet to the respective processor for processing the display data destined for the respective display panel.

Alternatively, the plurality of packets of display data may be received in separate streams of display data from the host device, with each separate stream comprising packets of display data destined for one particular display panel.

This embodiment is beneficial because it takes greatest advantage of the ability to use multiple connections each carrying a separate stream of display data, thus reducing latency and also reducing the need for compression, which will result in better image quality. The use of parallel processing methods is also beneficial because it means that data can be processed more quickly than if serial processing is used, thus further reducing latency.

The method may further comprise configuring the host device according to a number of display panels in the display device, such that display data destined for each of the display panels is generated by the host device.

According to a second aspect, the invention provides a display control device configured to perform a method as described above.

In a third aspect, the invention provides a display system comprising:
- a display device comprising at least two display panels, the display panels together forming a single display screen for displaying at least one complete image, each display panel having a display input for receiving display data of part of the complete image from a corresponding display output of a display control device;
- a host device configured to generate a plurality of packets of display data, wherein the display data in each packet is destined for one of the display panels;
- a display control device as described above, wherein each display output is coupled to the corresponding display input of the display device.

In an embodiment, the host device is configured according to a number of display panels in the display device, such that display data destined for each of the display panels is generated.

This is beneficial because it will make the configuration of the system more flexible, allowing for different combinations of displays and display panels to be connected to the same host device without the need for changes to software or hardware settings that may be difficult for the user. It will also allow for the use of many display panels in a single display to be invisible to the user so that he or she believes that the display screen comprises a single display panel.

The host device may be coupled to the display control device over a general purpose connection., such as a Universal Serial Bus, USB, connection or an Ethernet connection. The general purpose connection may be a wireless connection. Alternatively, the display device may be coupled to the display control device over a display specific connection, such as a VGA, DVI, HDMI or DisplayPort connection. The display specific connection may be a wireless connection.

Provision of this device is beneficial because it allows the user to connect a display to a host by a general-purpose connection such as USB even though the display may require a display-specific data format. This will then be more convenient for the user and will mean that fewer connection points need to be provided on the host.

The parts of this aspect may be integral parts of a single device such as a laptop or mobile device or may be separate devices. The display control devices may be integrated into either the host or the display.

If the user has access to an especially high-bandwidth general-purpose connection, provision of the display control device will also allow multiple data streams to be supplied separately to multiple panels while only requiring the user to connect one cable to the host.

In alternative embodiments, the display control device may be arranged so as to:
- Receive the separate streams through a single connection in an interleaved format, identify them and split them apart from each other such that they can be processed through parallel processing and transmitted through individual output connections as separate inputs to separate panels; and/or
- Be duplicated such that each display control device receives and processes the input associated with a different panel, each display control device acting in time with the others according to the synchronisation data transmitted from the host; and/or
- Perform the conversion of display data formatted for a general-purpose network connection into a display-specific format via serial processing, in which all processing is carried out using a single processor, using the synchronisation data transmitted from the host to synchronise onward transmission.

BRIEF DESCRIPTION OF THE DRAWINGS

Embodiments of the invention will now be more fully described, by way of example, with reference to the drawings, of which.

DETAILED DESCRIPTION

Figure 1:
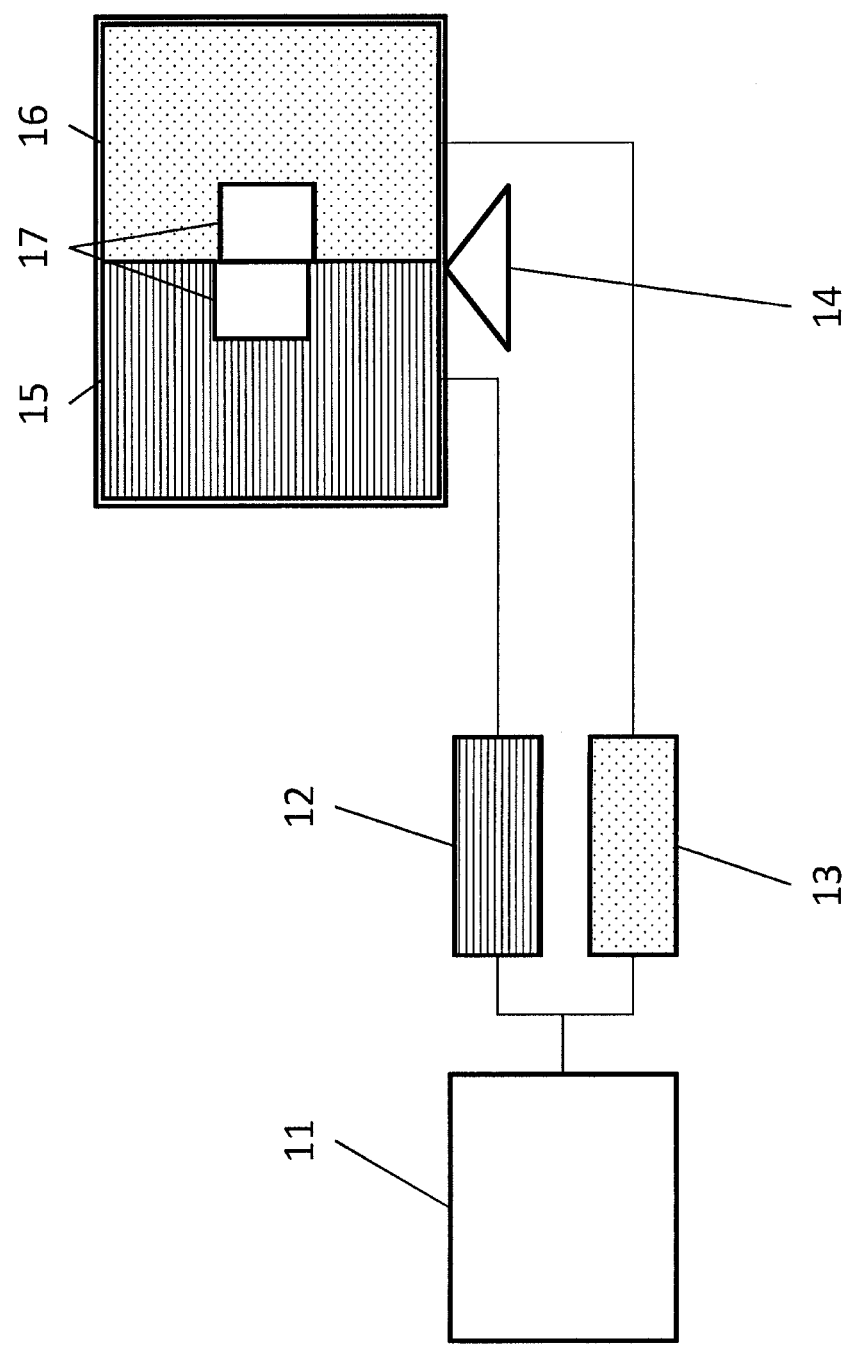
FIG. 1 shows a schematic of a known system, showing two inputs to two panels in a single display using duplicated display control devices.

FIG. 1 shows a schematic of a known display system comprising a host 11, two display control devices 12 and 13 and a display 14 which is split into two panels 15, 16. The host 11 is connected to the display control devices 12 and 13 via general-purpose connections such as USB. In this example, there are two connections from the host 11, one to each display control device 12 and 13, and each display control device 12 and 13 processes the display data associated with one panel. The hatching on the diagram indicates that the display control device marked with dots 12 processes display data associated with the panel marked with dots 15 and likewise for the display control device 13 and panel 16 marked with lines.

The display 14 is showing an application window 17 which is in a position such that it is displayed on both panels 15, 16. However, as the user moves the application window 17 in the conventional way, the visual artefact known as tearing occurs. As is visible in FIG. 1, the part of the application window 17 that is shown on the left-hand panel 15 lags behind as the application window 17 is moved downwards. This is due to a lack of synchronisation between the panels 15, 16.

Figure 2:
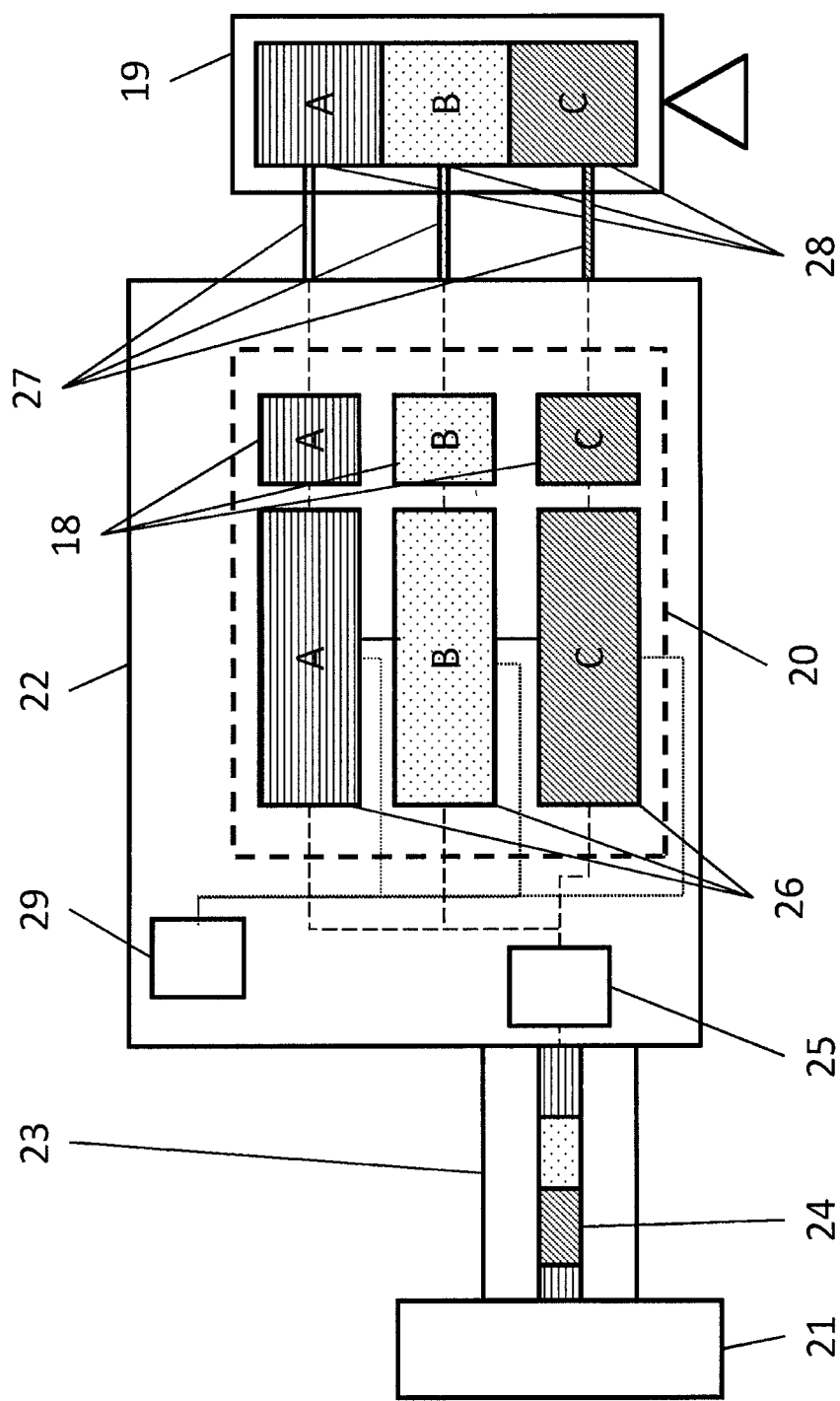
FIG. 2 shows a schematic of a first embodiment of a display system having a display control device arranged to receive streams of data through a single connection and split them for processing.

FIG. 2 shows a schematic of an example embodiment of a display device including a display control device 22, which in this embodiment processes display data 24 in a processing module 20 supplied over a single connection 23 from a host 21 by parallel processing. In FIG. 2, three panels 28 are shown forming a complete display screen of a display device 19, although, as aforementioned, the host 21 treats all three panels 28 as separate displays. The processing module 20 includes, in this case, three processors 26A, 26B, and 26C, with each processor processing the display data destined for a particular respective panel 28A, 28B, and 28C.

In this embodiment, the display data is transmitted as an interleaved stream 24 across a single connection 23, which may be a USB cable, although it could also be a wireless connection or any other wired connection, such as an Ethernet connection.

The data is then divided into separate streams by a hub 25, which reads the packet headers in order to determine which panel 28 is associated with each packet in the single stream 24. Each processor has an associated buffer 18A, 18B, and 18C where the processed display data is stored prior to being output to the respective panels 28A, 28B, and 28C. These distinctions are indicated by the different shadings used for the packets, processors 26, buffers 18 and panels 28 such that packets with horizontal lines are directed by the hub 25 to the processor 26A, from where the processed data is stored in buffer 18A, which supplies an output of the display control device connected via a respective connection 27 to an input of the respective panel 28A. Similarly, packets with dots are directed by the hub 25 to the processor 26B, from where the processed data is stored in buffer 18B, which supplies an output of the display control device connected via a respective connection 27 to an input of the respective panel 28B and packets with diagonal lines are directed by the hub 25 to the processor 26C, from where the processed data is stored in buffer 18C, which supplies an output of the display control device 22 connected via a respective connection 27 to an input of the respective panel 28C.

As shown in FIG. 2, in this embodiment, one processor 26 handles the data for each panel 28 and the connections between the panels 28 and the processors 26 are hard-coded into the display control device 22. This embodiment would be appropriate where, for example, the display control device 22 was integral to the display or where there are three outputs for connection 27 to three inputs on the display of which one connection is connected directly to each panel 28.

The three processors 26 receive clock signals from a local clock 29 so that they are synchronised together. The processors communicate with each other so that they control their respective buffers to output display data simultaneously so that the synchronisation of the data is preserved when it is sent to the panels 28. In this embodiment, synchronisation is achieved by forcing every buffer 18 to wait until all of the buffers 18 are ready and then instructing them all to transmit their data on the next clock 'tick'. The clock signals are illustrated with dotted lines, in contrast to the data paths, which are illustrated with dashed lines.

Figure 3:
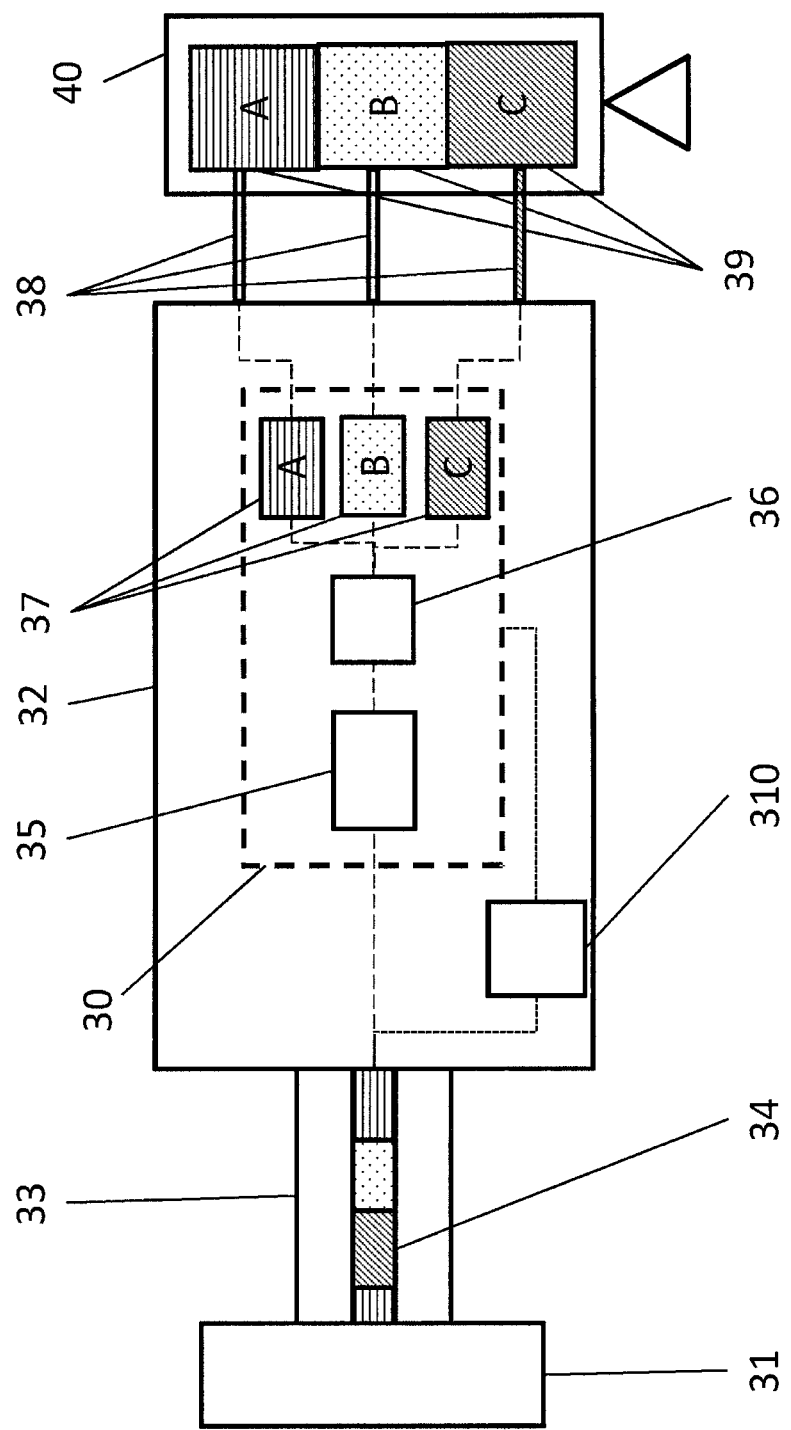
FIG. 3 shows a schematic of a second embodiment of a display system having a display control device arranged to process the received display data via serial processing.

FIG. 3 shows a second embodiment of the display control device in which a display control device 32 is arranged to process display data through serial processing, using a single processor 35. Similarly, to the embodiment of FIG. 2, display data is supplied through an interleaved stream 34 over a single connection 33 from the host 31. The data will also be accompanied by timing signals from the host device. In USB, the timing signals may be starter frame packets (in USB version 2) or isochronous timestamp packets (ITP) (in USB version 3). For Ethernet, they may be broadcast synchronisation signals sent, for example, in the transport protocol.

In this embodiment, the connection is a USB cable arranged according to the USB Version 3 standard, which includes isochronous timestamp packets as part of the transport protocol. These are broadcast by the host 31 to all USB-connected devices at predictable intervals of 125 microseconds. When the isochronous timestamp packets (ITPs) are received, they are passed to a timing engine 310 which processes them to produce synchronisation signals at a frequency of 32 milliseconds. As shown in FIG. 2, a synchronisation data path is arranged from the host 31 to the timing engine 310 and then to an output engine 36 of processing module 30 and shown as dotted lines, with display data paths being shown as dashed lines.

When display data is received by the display control device 32, it is immediately fed to a single processor 35 of processing module 30, which processes the data while leaving the headers intact. This means that it will be possible to transmit each packet to the correct panel 38. Such serial processing method might introduce some latency, but could be beneficial where latency is not important but it is important to save cost. Onward transmission is performed by the output engine 36, which reads the headers to determine which of the panels the particular processed display data is destined for. The output engine 36 then directs the processed display data to one of three (or however number of panels there are in display device 40) buffers. Each buffer comprises a FIFO buffer 37 associated with each panel 39 and has an output to each panel 39. The output engine 36 receives display data from the processor 35 and places it in the correct buffer 37 according to the indication in the header of which panel the display data is destined for. The output engine controls the buffers 37A, 37B, and 37C to send the display data in a synchronised manner using the synchronisation signals produced by the timing engine 310, ensuring that despite the serial nature of the arrival and processing of the data it will be properly synchronised on arrival at the respective panels 39A, 39B, and 39C of the display device 40.

Synchronisation can be achieved, for example, by instructing the output engine 36 to transmit the next packet from each buffer 37A, 37B, and 37C simultaneously on a particular clock 'tick'. In one embodiment, the output engine 36 could be controlled to use a timing method as will now be described with reference to FIGS. 4 and 5.

Figure 4:
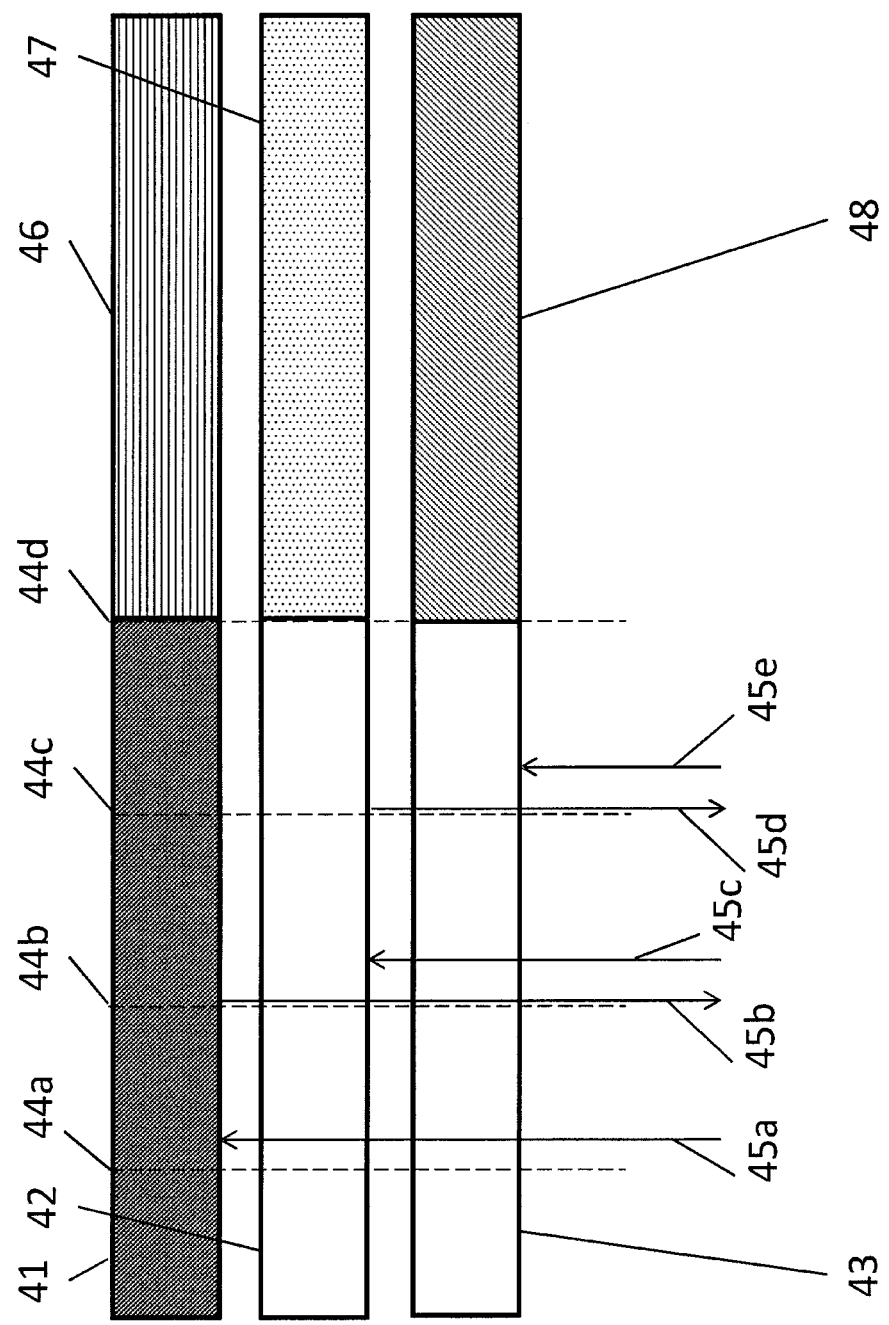
FIG. 4 shows how synchronisation timing signals can be used in the embodiments of either FIG. 2 or FIG. 3 to aid synchronisation.
Figure 5:
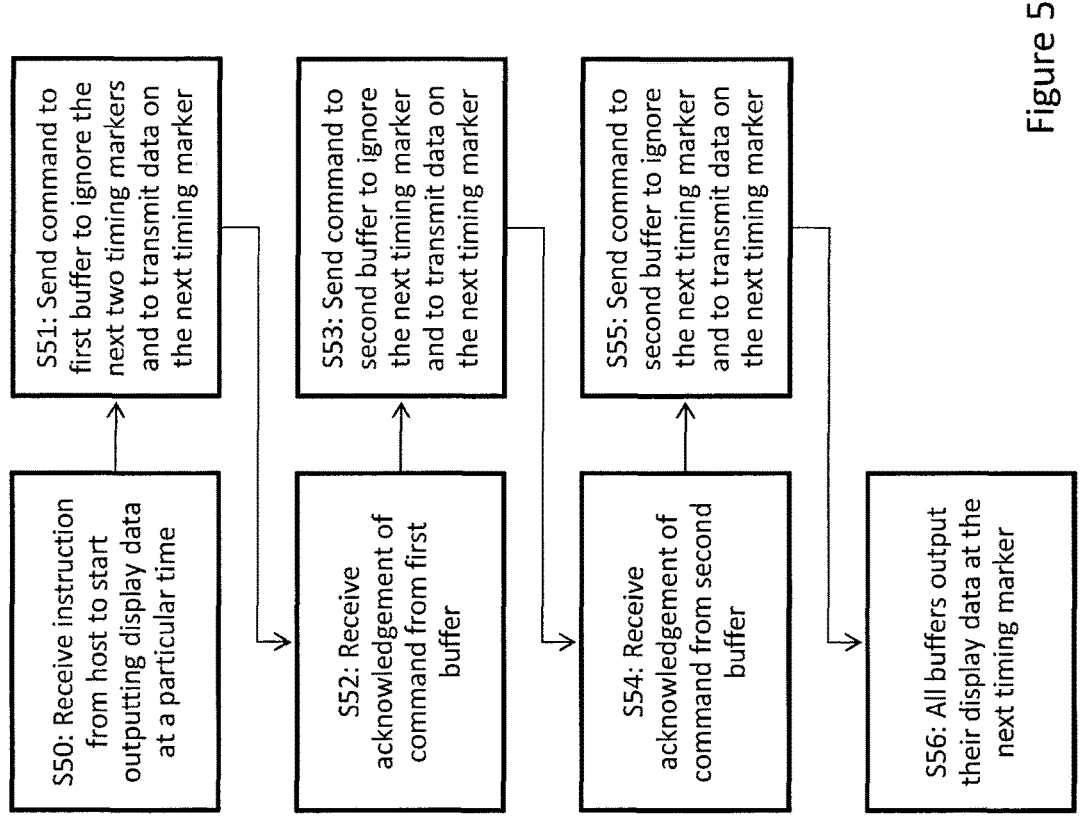
FIG. 5 is a flowchart showing the process of display synchronisation with reference to FIG. 4.

FIG. 4 shows the operation of an example embodiment of the synchronisation mechanism which uses USB and FIG. 5 shows the process associated with this embodiment. This process may be performed in output engine 36 of FIG. 3 or by a separate controller.

Thus, with reference also to FIG. 4, the output engine 36 receives timing signals 44a-44d, at 32 millisecond intervals from timing engine 310, as mentioned above. Elements 41, 42, and 43 illustrate, schematically, the timing markers that in this embodiment are 32 milliseconds apart at the respective buffers of the display control device. The output engine 36 receives an instruction (as indicated by step S50 in FIG. 5) from the host to start outputting the display data to the display device at a particular time and uses the timing signals to synchronise the start of the output. Thereafter, the continued output will be synchronised because the clock for all three FIFOs will be the same.

The output engine 36 sends a command 45a at some point (as indicated by Step S51 in FIG. 5) to the first FIFO (41 in FIG. 4) instructing it to ignore the next two timing markers 44b and 44c and to begin transmitting display data on the next timing marker 44d after that. In this case, the instruction tells the FIFO to ignore two timing markers as there are two further FIFOs in the processing module that need to be synchronised. It will be appreciated that if there was only one further buffer, then the buffer would be instructed to only ignore one timing marker before starting to transmit the display data on the next timing marker after the ignored one, and if there were more than two further buffers, then the buffer would be instructed to ignore as many timing markers as there were further buffers.

At Step S52, the next timing marker 44b arrives and the first buffer 41 replies with an acknowledgement 45b to the output engine.

At Step S53, the output engine has received the acknowledgement 45b from the first buffer 41 and sends a similar command 45c to the second buffer 42. This command contains an instruction to ignore the next timing marker 44c and to begin transmitting display data on the next timing marker 44d after that, which will be the same timing marker 44d as that on which the first buffer 41 begins transmitting. Clearly, if there are no further buffers (apart from the first buffer), then the second buffer will not need to ignore any timing markers (i.e. the number of timing markers to ignore will be zero) and it will be instructed to transmit display data on the next timing marker. If, on the other hand, there are more than one further buffers (apart from the first buffer), then the second buffer would be instructed to ignore as many timing markers as there were further buffers.

At Step S54, the next timing marker 44c arrives and the second buffer 42 replies with an acknowledgement 45d.

At Step S55, the output engine has received the acknowledgement 45d from the second buffer 41 and sends a similar command 45e to the third buffer 43. This command contains an instruction to begin transmitting display data on the next timing marker 44d, which will be the same timing marker 44d as that on which the first and second buffers 41 and 42 begins transmitting. Again, if, there is still one or more further buffers (apart from the first and second buffers), then the third buffer would be instructed to ignore as many timing markers as there were further buffers.

At Step S56, the next timing marker 44d arrives and all the buffers 41, 42, and 43 begin transmitting their respective display data 46, 47, and 48.

Although only two particular embodiments have been described in detail above, it will be appreciated that various changes, modifications and improvements can be made by a person skilled in the art without departing from the scope of the present invention as defined in the claims. For example, hardware aspects may be implemented as software where appropriate and vice versa. Furthermore, it will be appreciated that although the synchronisation process has been described above as being controlled by the output engine, it could be controlled by a separate controller or by the host itself, since the timing markers 44 have a period of 32 milliseconds, whereas the USB timing signals from which they are derived by timing engine 310 have a period of 125 microseconds, so there is enough time for the acknowledgement to be received back at the host and the next command to be sent by the host before the next timing marker 44c. Furthermore, this synchronisation process could also be used with the embodiment of FIG. 2 instead of the local clock. Similarly, the local clock could be provided in the embodiment of FIG. 3 instead of using the timing from the host.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method of controlling a display device, the display device having at least two display panels, the display panels together forming a single display screen for displaying at least one complete image, each display panel having a display input for receiving display data of part of the complete image from a corresponding display output of a display control device, the method comprising:
   receiving, at the display control device, a plurality of packets of display data from a host device, wherein the display data in each packet is destined for one of the display panels;
   directing the packets to a processing module in the display control device for processing the display data;
   processing the display data and storing the processed display data in a respective buffer according to which respective display panel the display data is destined for; and
   controlling the processing module so that the processed display data is output from the buffers at a synchronized time to the display output corresponding to the respective display panel for which the display data is destined,
   wherein the processing module comprises a plurality of processors, each having an associated respective buffer, with a respective processor processing display data destined for a respective display panel, and each packet being directed to a respective processor according to which respective display panel the display data contained in that packet is destined for,
   wherein controlling the processing module so that the processed display data is output at a synchronized time to the display output corresponding to the respective display panel for which the display data is destined comprises:
      receiving, at each of the plurality of processors, a common timing signal comprising periodic timing markers; and
      instructing the respective processors to control the respective buffers to output the respective processed data from a respective buffer when a particular timing marker is received.

2. The method of claim 1, wherein instructing the processors to control the respective buffers to output the respective processed data from a respective buffer when a particular timing marker is received comprises:
   sending a first command to a first processor of the plurality of processors to ignore one or more first timing markers after receiving the first command and to control a first respective buffer to start to output the respective processed data when a particular subsequent timing marker is received; and
   sending a second command to a second processor of the plurality of processors to control a second respective buffer to start to output the respective processed data when the particular subsequent timing marker is received.

3. The method of claim 1, wherein instructing the processors to control the respective buffers to output the respective processed data from a respective buffer when a particular timing marker is received comprises:

sending a command to each of the processors in sequence instructing the respective processor to ignore at least as many timing markers after receiving the command as there are processors following the respective processor in the sequence of processors and to control a respective buffer to start to output the respective processed data when a next timing marker after the ignored timing markers is received.

4. The method of claim 1, further comprising:
receiving the common timing signal from a local clock in the display control device or from the host device;
wherein:
the common timing signal comprises regular timestamp packets transmitted on a Universal Serial Bus (USB) connection between the display control device and the host device; or
the common timing signal comprises broadcast synchronisation packets transmitted on an Ethernet connection between the host device and the display control device.

5. The method of claim 1, wherein the plurality of packets of display data is received from the host device over a general purpose data connection, the general purpose data connection being a Universal Serial Bus (USB) connection or an Ethernet connection.

6. The method of claim 1, wherein processing each packet of display data in the processing module for outputting to the display output corresponding to the respective display panel for which the display data contained in the packet is destined comprises converting the display data into a display-specific format, the display-specific format being VGA, DVI, HDMI or DisplayPort format.

7. The method of claim 1, wherein:
the plurality of packets of display data are received in a common stream of display data from the host device; or
wherein the plurality of packets of display data are received in separate streams of display data from the host device, with each separate stream comprising packets of display data destined for one particular display panel.

8. The method of claim 1, further comprising configuring the host device according to a number of display panels in the display device, such that display data destined for all of the display panels is generated by the host device.

9. A method of controlling a display device, the display device having at least two display panels, the display panels together forming a single display screen for displaying at least one complete image, each display panel having a display input for receiving display data of part of the complete image from a corresponding display output of a display control device, the method comprising:

receiving, at the display control device, a plurality of packets of display data from a host device, wherein the display data in each packet is destined for one of the display panels;
directing the packets to one or more processors of a processing module in the display control device for processing the display data;
processing the display data and storing the processed display data in a respective buffer according to which respective display panel the display data is destined for; and
controlling the processing module so that the processed display data is output from the buffers at a synchronized time to the display output corresponding to the respective display panel for which the display data is destined;

wherein the processing module comprises a processor and a plurality of the buffers, with the processor processing the received display data and directing the processed display data to a respective buffer according to which respective display panel the display data is destined for;

wherein controlling the processing module so that the processed display data is output at a synchronized time to the display output corresponding to the respective display panel for which the display data is destined comprises:

receiving, at each of the buffers, a common timing signal comprising periodic timing markers; and
controlling each of the buffers to start to output the respective processed data to the respective display output when a particular timing marker is received.

10. The method of claim 9, wherein controlling each of the buffers to start to output the respective processed data to the respective display output when a particular timing marker is received comprises:

sending a first command to a first buffer of the buffers to ignore one or more first timing markers after receiving the first command and to start to output the respective processed data when a particular subsequent timing marker is received; and
sending a second command to a second buffer of the plurality of buffers to start to output the respective processed data when the particular subsequent timing marker is received.

11. The method of claim 9, wherein controlling each of the buffers to start to output the respective processed data to the respective display output when a particular timing marker is received comprises:

sending a command to each of the buffers in sequence instructing the respective buffer to ignore at least as many timing markers after receiving the command as there are buffers following the respective buffer in the sequence of buffers and to start to output the respective processed data when a next timing marker after the ignored timing markers is received.

12. The method of claim 9, further comprising receiving the common timing signal from a local clock in the display control device, or from the host device, or wherein the common timing signal comprises regular timestamp packets transmitted on a Universal Serial Bus (USB) connection between the display control device and the host device, or wherein the common timing signal comprises broadcast synchronisation packets transmitted on an Ethernet connection between the host device and the display control device.

13. The method of claim 9, wherein the plurality of packets of display data is received from the host device over a general purpose data connection, the general purpose data connection being a Universal Serial Bus (USB) connection or an Ethernet connection.

14. A display control device, for controlling a display device, the display device having at least two display panels, the display panels together forming a single display screen for displaying at least one complete image, each display panel having a display input for receiving display data of part of the complete image from a corresponding display output of a display control device, the display control device comprising:

a processing module having a plurality of processors; and
a controller;

wherein the display control device is configured to:
receive a plurality of packets of display data from a host device, wherein the display data in each packet is destined for one of the display panels;
direct the packets to the plurality of processors;
process, using the processing module, the display data and store the processed display data in a respective buffer according to which respective display panel the display data is destined for; and
control, using the controller, the processing module so that the processed display data is output from the buffers at a synchronized time to the display output corresponding to the respective display panel for which the display data is destined;
wherein each of the plurality of processors has an associated respective buffer, with a respective processor processing display data destined for a respective display panel, and each of the plurality of packets being directed to a respective processor according to which respective display panel the display data contained in that packet is destined for,
wherein the controller is configured to control the processing module so that the processed display data is output at a synchronized time to the display output corresponding to the respective display panel for which the display data is destined wherein each of the plurality of processors receives a common timing signal comprising periodic timing markers, and the controller is configured to instruct the respective processors to control the respective buffers to output the respective processed data from a respective buffer when a particular timing marker is received.

15. A display system comprising:
a display device comprising at least two display panels, the display panels together forming a single display screen for displaying at least one complete image, each display panel having a display input for receiving display data of part of the complete image from a corresponding display output of a display control device;
a host device configured to generate a plurality of packets of display data, wherein the display data in each packet is destined for one of the display panels;
a display control device according to claim 14, wherein each display output is coupled to the corresponding display input of the display device.

16. The display system of claim 15, wherein the host device is configured according to a number of display panels in the display device, such that display data destined for all of the display panels is generated by the host device.

17. The display system of claim 15, wherein the host device is coupled to the display control device over a general purpose connection such as a Universal Serial Bus (USB) connection or an Ethernet connection, and which may be a wireless connection.

18. The display system of claim 15, wherein the display device is coupled to the display control device over a display specific connection, the display specific connection being a VGA, DVI, HDMI or DisplayPort connection, and which may be a wireless connection.

19. A display control device, for controlling a display device, the display device having at least two display panels, the display panels together forming a single display screen for displaying at least one complete image, each display panel having a display input for receiving display data of part of the complete image from a corresponding display output of a display control device, the display control device comprising:
a processing module having a plurality of processors; and
a controller;
wherein the display control device is configured to:
receive a plurality of packets of display data from a host device, wherein the display data in each packet is destined for one of the display panels;
direct the packets to the plurality of processors;
process, using a respective one of the processors, the display data and store the processed display data in a respective buffer according to which respective display panel the display data is destined for; and
control, using the controller, the processing module so that the processed display data is output from the buffers at a synchronized time to the display output corresponding to the respective display panel for which the display data is destined;
wherein the controller is configured to control the processing module so that the processed display data is output at a synchronized time to the display output corresponding to the respective display panel for which the display data is destined, wherein each of the buffers receives a common timing signal comprising periodic timing markers, and the controller is configured to control each of the buffers to start to output the respective processed data to the respective display output when a particular timing marker is received.

20. A display system comprising:
a display device comprising at least two display panels, the display panels together forming a single display screen for displaying at least one complete image, each display panel having a display input for receiving display data of part of the complete image from a corresponding display output of a display control device;
a host device configured to generate a plurality of packets of display data, wherein the display data in each packet is destined for one of the display panels;
a display control device according to claim 19, wherein each display output is coupled to the corresponding display input of the display device.

* * * * *